United States Patent Office

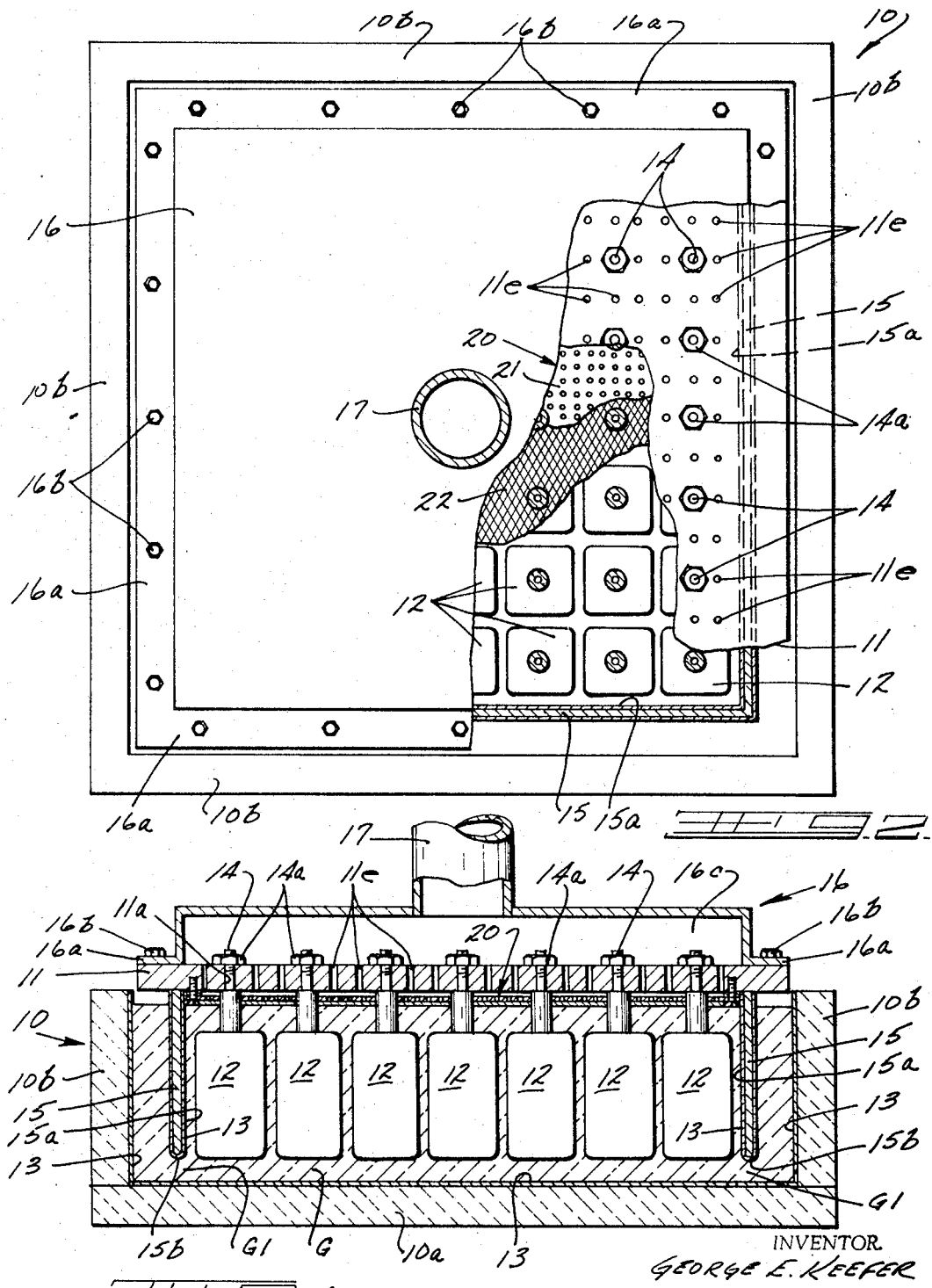

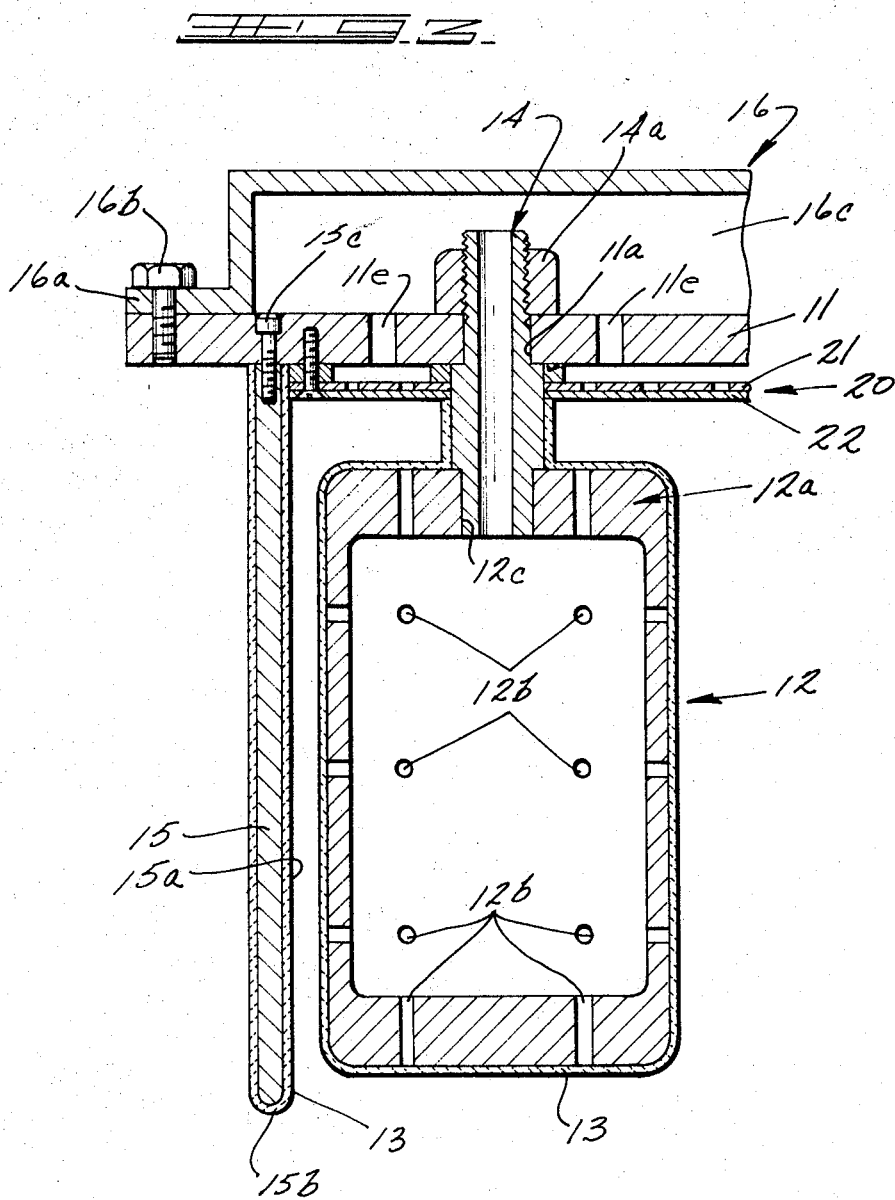

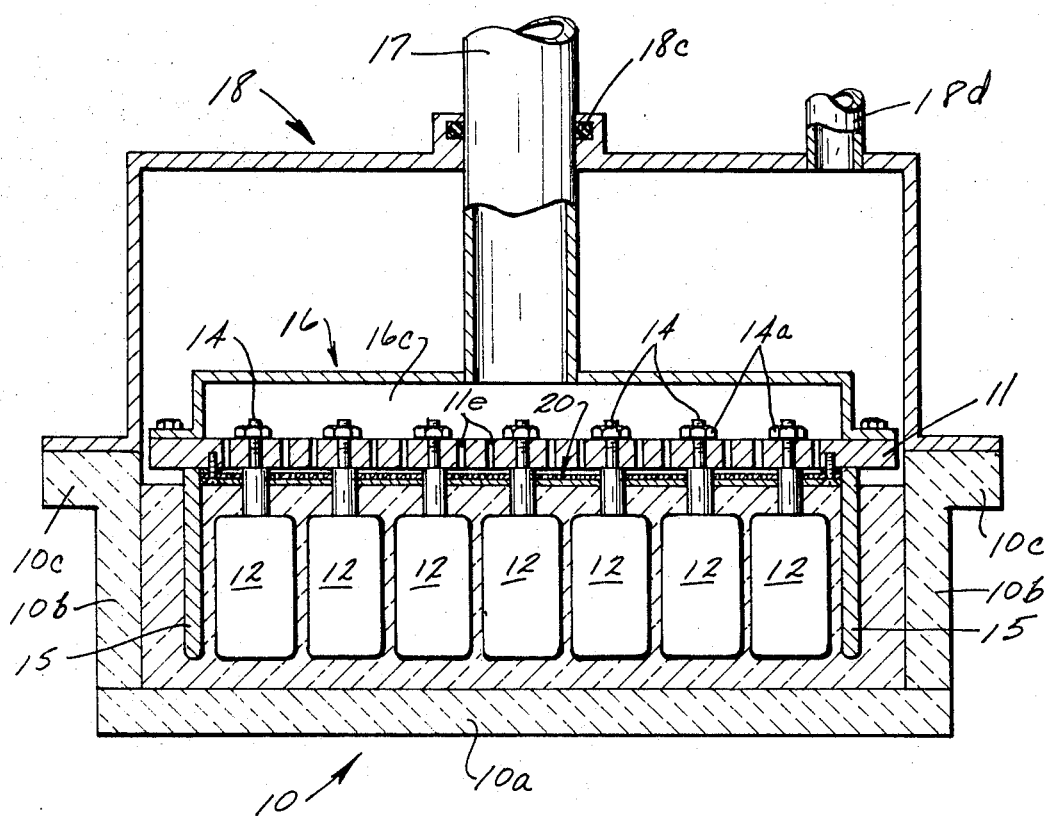

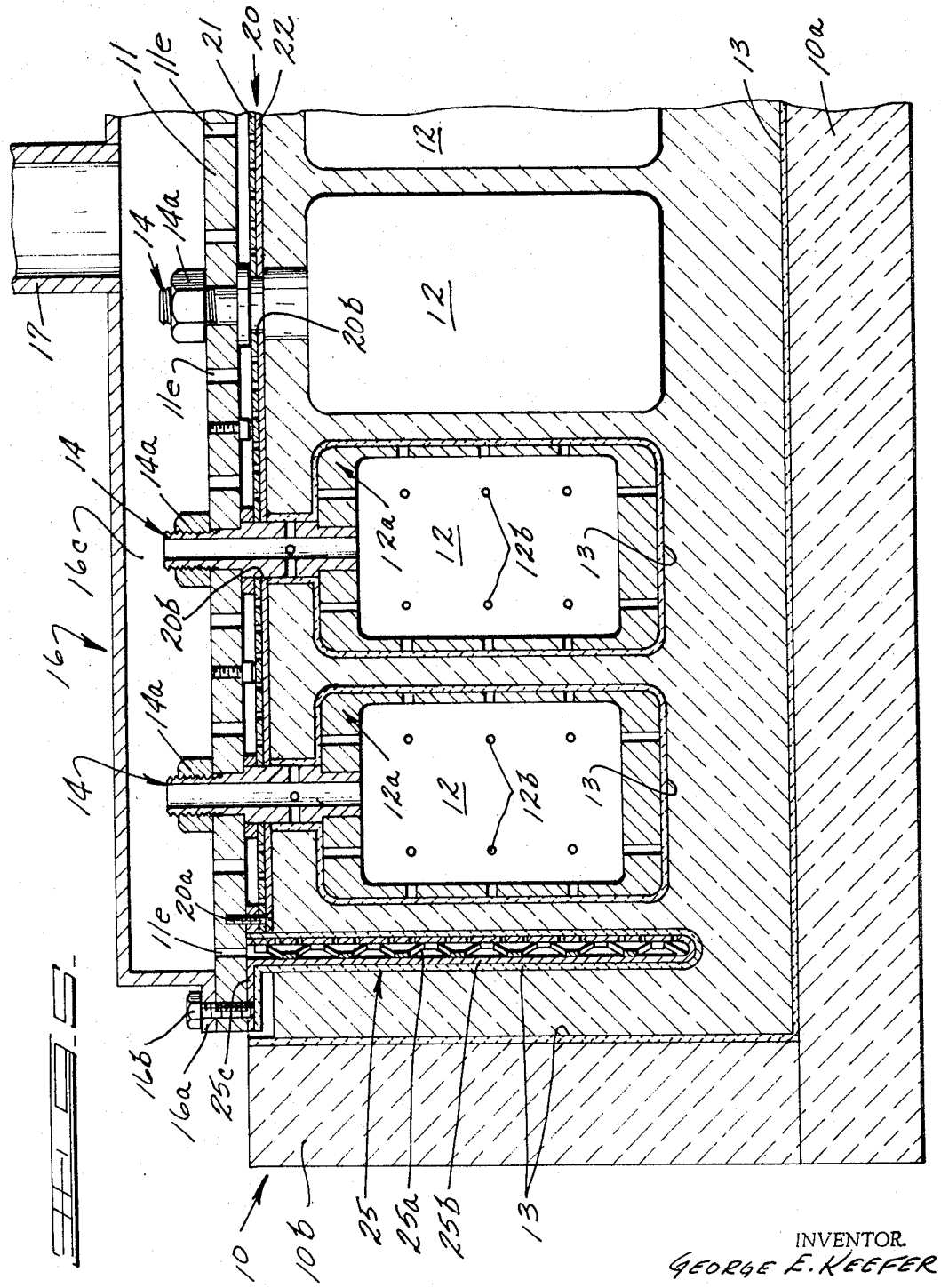

3,453,094
Patented July 1, 1969

3,453,094
METHOD AND APPARATUS FOR PRODUCING HOLLOW GLASS ARTICLES BY MODULE IMMERSION TECHNIQUE
George E. Keefer, Toledo, Ohio, assignor to Owens-Illinois, Inc., a corporation of Ohio
Continuation-in-part of application Ser. No. 503,831, Oct. 23, 1965. This application Mar. 10, 1967, Ser. No. 622,357
Int. Cl. C03b 19/02
U.S. Cl. 65—23                    10 Claims

ABSTRACT OF THE DISCLOSURE

Module for forming the cavity of a hollow glass article by immersion in molten glass, wherein the bulk of the module is formed of a rigid material that is molten at the fiber softening point temperature of the glass and has sufficient heat absorbing capacity to solidify the adjacent surface layer of molten glass, and an external coating on the module of a heat insulating material which has a lower coefficient of thermal conductivity than the rigid material of the bulk of the module. Method of forming a hollow glass article by inserting the module into a pool of molten glass to permit complete immersion of module into glass prior to complete solidification of the glass in narrow spaces between adjacent modules.

---

This application constitutes a continuation-in-part of my pending application U.S. Ser. No. 503,831, filed Oct. 23, 1965, and assigned to the assignee of this application. Certain features disclosed herein are disclosed and claimed in a copending application Ser. No. 622,347 filed by me and Paul J. Qualls on the same date as the present application.

As is described in detail in the aforementioned copending application, the module immersion technique has been successfully applied in the production of relatively large glass bodies having a plurality of closely spaced internal cavities. The desired internal cavities are produced by the immersion of normally rigid modules in a pool of molten glass and effecting the solidification of the glass around such modules. The bulk of the module is formed from a material having a melting point below the fiber softening point, preferably below the annealing point of the particular glass in which the module is to be immersed. As a result, the module material melts as the molten glass rigidifies around the module and hence the module material may be removed from the glass in liquid form simply by inverting the glass article when it has cooled to rigidity.

A typical material from which such modules are formed has sufficient heat-absorbing capacity to insure that the adjacent portions of the molten glass are rigidified. Moreover, most practicable candidate meltable module materials have a substantially higher coefficient of thermal conductivity than the glass. Under these circumstances, and particularly where a plurality of closely spaced modules are simultaneously immersed in the glass and a minimum spacing is provided between the adjacent modules, or a module and an adjacent mold wall, the rate of heat withdrawal from the molten glass is so high that those portions of the molten glass flowing into the relatively narrow spaces between adjacent modules becomes rigid before the complete insertion of the modules in the molten glass is accomplished. As a result, two undesirable conditions may and do occur. In the first place, the molten glass is forced to seek another path to flow upwardly around the modules and thus complete the immersion of the modules and fill in the top portions of the relatively narrow space between the adjacent modules. This often results in voids being unintentionally produced in the space between the modules, resulting in a defective article. Secondly, and equally detrimental, is the fact that the relatively fast rigidification of the molten glass between the adjacent modules necessarily requires the application of a much larger force to the modules to complete their immersion. When mechanical means are solely relied upon for the production of such increased immersion force, it has been observed that undue stresses are produced in the glass that has become rigid before the mechanical motion has stopped, often resulting in cracking of these portions, and again resulting in a defective article. The prior art method and apparatus in which the aforementioned problems are encountered, are exemplified by the disclosure of U.S. Patent No. 2,045,716, issued June 30, 1936, to G. V. McCauley.

In accordance with this invention, the rate of heat flow from the molten glass into the respective modules is controlled through the application of a relatively thin layer of insulating material to the glass contacting surface of the module. Such reduced rate of heat flow permits the complete immersion of the modules in the molten glass to be accomplished before complete solidification of the molten glass is effected in the relatively narrow spaces between adjacent modules. In other words, there is always a discrete thickness of molten glass between the adjacent modules to permit the molten glass to flow upwardly relative to the modules and complete the immersion process. Additionally, in accordance with this invention, a fluid pressure differential is applied to the molten glass in the areas thereof surrounding the modules so as to provide a uniform force operating on all portions of the molten glass tending to move it upwardly relative to the modules to effect the complete immersion of the modules.

ON THE DRAWINGS

FIG. 1 is a vertical sectional view of an immersion casting apparatus embodying the improvements of this invention.

FIG. 2 is a plan view, partly in section, of FIG. 1.

FIG. 3 is an enlarged scale, vertical sectional view of a portion of the apparatus of FIG. 1.

FIG. 4 is a vertical sectional view of a modified casting apparatus embodying this invention.

FIG. 5 is an enlarged scale, vertical sectional view of a portion of the apparatus of FIG. 4.

As is clearly set forth in my aforementioned copending patent application, the module immersion technique of fabricating large glass articles having a plurality of internal cavities is applicable to any type of glassy material which is capable of assuming a molten form. Similarly, a large variety of module materials can be employed to form the immersion modules, so long as the selected module material is meltable at or near the annealing point of the molten glass. Specific examples of such glasses and suitable module materials are set forth in my aforementioned copending application and will not be repeated here.

Referring to FIG. 1, the apparatus embodying the improvements of this invention comprises an open top primary mold or container having a bottom wall 10a, and a peripheral upstanding sidewall 10b. The materials of walls 10a and 10b should be compatable with and capable of containing the molten glass to be cast. The bottom wall 10a preferably defines a surface corresponding to the desired bottom surface of the glass article to be cast; however, such bottom wall has a substantially greater peripheral area than is desired in some cases in the final glass article. The upstanding sidewall 10b may, if desired, correspond generally to the desired sidewall configuration of the glass article to be molded but this is not essential. Sidewall 10b may be formed from separate pieces to facilitate assembly to and removal from bottom wall 10a. Bolts or clamping devices (not shown) may be utilized to secure wall 10b to base 10a. In any event, the primary mold defines an open top cavity which may be substantially filled by the molten glass material G.

A module supporting plate 11 is provided which corresponds generally in configuration to the primary mold 10 but is often slightly smaller in peripheral extent than such primary mold 10 so as to permit the plate 11 to be insertable within the top portions of the sidewall 10b, and also to allow ambient pressure at the glass surface. A plurality of modules 12 are supported by plate 11 in a depending relationship thereto, as for example, by a threaded tubular stem 14 which passes through suitable vertical apertures 11a in the plate 11 and are secured to the plate by nuts 14a.

In accordance with this invention, the plate 11 also supports in depending relationship a peripheral molding wall 15, the interior surface 15a of which defines the desired external surface of the glass article to be molded. The molding wall 15 is secured to plate 11 in any suitable fashion as by clamps or bolts 15c (FIG. 3) and may be formed in several pieces to facilitate assembly or removal.

The module supporting plate 11 is, in turn, supported by an inverted cup-shaped structural element 16 having an out turned radial flange 16a around its bottom periphery which is bolted to the top surface of the plate 11 by a plurality of bolts 16b. A hollow support tube 17 is coaxially secured to the central portions of the support structure 16 and conventional means (not shown) are provided to raise and lower the support tube 17 in order to effect corresponding movements of the module supporting plate 11 vertically toward and away from the primary mold 10. It should be additionally noted that the support structure 16 and support tube 17 define an enclosed plenum chamber 16c and, as will be later described, this chamber is placed in fluid communication with a vacuum source (not shown) to effect a desired reduction of gas pressure within the chamber 16c during the module immersion step. Additionally plate 11 is provided with a plurality of apertures 11e.

Referring now specifically to FIG. 3, each module 12 comprises a hollow core 12a of meltable material, the external periphery of which generally conforms to the shape of the desired cavity to be formed in the glass article except that each core 12a is smaller than the desired cavity. The bottom portions of support stem 14, which can be made from a non-melting or a meltable material, is pressed into, or otherwise suitably secured in a top opening 12c in the hollow core 12a. Module 12 is brought to its proper dimensions to function as the cavity forming device through the application to all glass contacting surfaces of the core 12a of a relatively thin surface coating 13 of a heat insulating material. Such material is selected to provide sufficient resistance to the heat flow transmitted from the molten glass to the module core so as to prevent premature rigidification of any substantial depth of the adjacent molten glass, particularly in the relatively thin web areas which exist between closely spaced adjacent modules. Additionally, the coating 13 should have the property of being a noncontaminate of the molten glass and be capable of ready removal from the glass when the glass article is rigidified and cooled. For other reasons, the coating 13 should be porous to gases, but impervious to molten glass.

The insulating coating material 13 can be any refractory material that has a lower coefficient of thermal conductivity than the module material; of course, the material chosen is one that can withstand the temperatures involved and that is not appreciably chemically attacked by the molten glass or the module material. The particular material discussed herein in connection with the described embodiments. Fiberfrax®, a product of The Carborundum Company, representative of refractory, matted, fibrous silica-alumina materials which have been found to be especially useful. The composition of the Fiberfrax material employed in weight percent was 50.9 $Al_2O_3$, 46.8 $SiO_2$, 1.2 $B_2O_3$, 0.8 $Na_2O$, with traces of other inorganics (0.3–0.5 percent).

In the embodiments where a vacuum is pulled through the module, the low conductivity refractory material used is foraminous or porous, as in the case of Fiberfrax. However, when a vacuum is not pulled through the module, the low coefficient of thermal conductivity material on the surface of the module need not be porous, as will be understood.

The insulating material 13 may be applied to the core surface in the form of a tape which is wrapped snugly around the entire portion of the core 12a that will be in contact with the molten glass. Alternatively, the insulating material may be formed as a slurry which is then coated on the core material and dried in place prior to insertion of the respective module into the molten glass. It has also been found desirable to apply coating 13 to the glass contacting surfaces of mold walls 15, 10a, and 10b where it functions as an effective mold release agent, in addition to its functioning to delay heat transfer.

It will be noted that the module cores 12a are shown as hollow and are provided with a plurality of wall apertures 12b communicating with the internal surface of the porous insulating coating 13. As will be later described, this construction is desirable in that it effects the removal of any gas bubbles or seeds which generally form on the surface of the coating 13 as the modules are lowered into the molten glass, as well as the gases originally contained in the pores of coating 13. By providing hollow support stems 14 for each module which are in fluid communication with the plenum chamber 16c defined by the support structure 16, it will be apparent that the great majority of gas bubbles or seeds tending to collect on the module coating 13 will be removed through the interconnected vacuum system.

In the operation of the apparatus shown in FIGS. 1–3, the module carrier plate 11 and the connected depending modules 12 are originally positioned above the primary mold 10 to permit such mold to be filled with a pool of molten glass G. The module plate 11 is then lowered toward the pool of molten glass G and concurrently vacuum is applied to plenum chamber 16c to reduce the gas pressure existing within the interior of each hollow module 12 and also above the surface of the molten glass G immediately adjacent to each module. This vacuum system is completed when the bottom end 15b of the molding wall 15 contacts the molten glass G. As the module support plate 11 is lowered into its final molding position where the modules 12 are disposed at a desired spacing above the bottom 10a of the primary mold 10, those portions of the pool of molten glass G which are external of the molding wall 15 are continuously exposed to ambient gaseous pressure. It is therefore apparent that the entire body of molten glass G is subjected to a fluid pressure force tending to move the molten glass upwardly around the modules 12, and between the modules 12 and the adjacent molding wall 15, as such modules are concurrently being lowered into the molten glass.

As each module 12 contacts the molten glass, the heat transfer from the molten glass to the module effects a rigidification of a thin skin of the glass immediately adjacent to the module surface; however, due to the heat insulating effects of the module coating 13, this skin does not acquire any substantial depth, even in the spaces between the adjacent modules, for a limited time period; hence the bulk of the glass will remain in a substantially molten condition and hence free to rise upwardly around and between the modules 12 and thereby to accurately conform to all surfaces of all modules prior to any substantial thickening of the skin of rigid glass around each module. With the described apparatus the air contained in the pores of coating material 13, are immediately removed due to the fact that the interior of the modules is exposed to vacuum so that gases existing in the surface of the modules are withdrawn through the interior of the modules.

It will be noted that when the module carrying plate 11 is moved downwardly to its final desired position with respect to the primary mold 10, the bottom portion 15b of the molding wall 15 is still spaced slightly above the bottom wall 10a of the primary mold. This is to insure that the fluid pressure forces acting on the molten glass will be fully effective until the molten glass contained within the molding wall 15 has reached its final position relative to the inserted modules 12.

As the molten glass cools, it does so primarily by heat transfer to the inserted modules 12, thus effecting the melting of the module cores 12b; however, the thin skin of rigidified glass which forms almost instantly around each module is sufficiently rigid to insure that the desired cavity, corresponding in shape to the original configuration of each module, is produced within the glass body.

When the entire glass body has cooled sufficiently to be self-supporting and the module material is at a temperature at or above its melting point, the module carrying plate 11 can be elevated away from the glass body due to the fact that the core material engaging the supporting stems 14 of each module has melted, thus freeing the module support plate 11 from the glass. The rigid molding wall 15 can readily be pulled out of engagement with the desired glass body confined therebetween due to the mold release action of the coating 13. Alternatively, the molding wall 15 in FIGS. 1, 3 or 4 can also be of a meltable material such as aluminum, with or without an outer insulating coating. The primary mold 10 may be removed from the solid glass at any convenient time. The molten module material can be removed from the glass body simply by inversion. The desired molded glass body (i.e., that portion originally confined within molding wall 15) can be obtained simply by cracking off those portions of the glass body that are external to the original position of the molding wall 15 through the narrow glass web G1 produced between the bottom position of the molding wall 15 and the adjacent bottom surface 10a of the primary mold 10. The module coating material can be removed from the glass cavities by air or grit blasting, or by acid leaching, or other suitable means.

From the foregoing description, it is apparent that the maximum fluid force that can be applied to the molten glass to assist it in its flow upwardly relative to the inserted modules is governed by the difference between the ambient pressure and the degree of vacuum produced within the plenum chamber 16c defined by the support structure 16. If additional fluid pressure is desired, then the modification of this invention shown in FIG. 4 may be utilized. In this modification, the primary mold 10 is provided at its top surface with a radial flange 10c and an inverted cup-shaped cover 18 is sealingly secured to such flange by means not shown and is provided with a sliding seal 18c engaging the outside surface of support tube 17. A fluid conduit 18d communicates with the internal space defined by the cover 18 and is connected to a suitable source (not shown) of compressed air or a compressed inert gas, depending upon the susceptibility of the particular molten glass to contamination by gases. With this arrangement, any desired degree of fluid pressure can be applied to those portions of the molten glass pool which lie externally to the peripheral molding wall 15 and hence a substantially higher fluid force can be imposed upon the molten glass to assist it in its movement relatively upwardly with respect to the modules 12 as the modules are inserted into the molten glass.

The peripheral molding wall 25 illustrated in FIG. 5 also represents a modification of this invention. If the presence of bubbles or seeds around the periphery of the desired glass article constitute a problem, the molding wall 25 may also be formed as a porous, hollow construction and connected in fluid communication with the vacuum plenum chamber 16c. Thus wall 25 comprises a central core 25a of expanded metal, a U-shaped perforated metal plate 25b surrounding such core, and an external coating 13 of Fiberfrax or similar porous, non-contaminating refractory, insulating material. The top end of plate 25b is provided with a horizontal flange 25c permitting the mounting of wall 25 to module support plate 11 by suitable bolts (not shown). Apertures 11e are provided in plate 11 communicating with core 25a. Thus any gas bubbles released adjacent to or on the wall coating 13 will be withdrawn through the vacuum system.

If it is desired to concurrently mold the top surface of the desired glass article, then a top molding plate 20 can be employed in either of the modifications of FIG. 1 and FIG. 4. Such plate is mounted beneath the module support plate 11 by suitable bolts 20a and spans the entire space defined between the top portions of the annular molding wall 15. Top molding plate 20 is, of course, suitably apertured as at 20b to receive the support stems 14 of the modules 12. Additionally, in order to not impede the removal of gases rising to the surface of the molten glass, the top plate 20 is preferably formed from a porous or foraminous material, such as, for example, a porous metal. Alternatively, and as specifically illustrated in FIGS. 3 and 5, the core plate 20 comprises a perforated or expanded metal plate 21 on the bottom glass contacting surface of which is provided a coating of porous insulating material 22 having the same characteristics as described for the insulating material 13. In either event, any gases rising to the surface of the molten glass are free to permeate through the top plate 20 and escape into plenum chamber 16c through the plurality of apertures 11c provided in plate 11, while the molten glass itself cannot so permeate the top plate 20, and hence top plate 20 molds the molten glass to conform to its surface.

Other objects and advantages of this invention will become apparent to those skilled in the art from the foregoing description and it is intended to include within the scope of the appended claims all obvious modifications and applications of this invention.

I claim:

1. A method of forming a hollow glass article having closely spaced internal cavities comprising concurrently inserting into a pool of molten glass normally rigid modules, each having an external configuration corresponding to the desired internal configuration of the hollow glass article, the bulk of said modules being formed of a material that is molten at the fiber softening point temperature of the glass contacting same and has sufficient heat absorbing capacity to solidify the adjacent surface layer of molten glass, and an external coating on said module of a heat insulating material which is a non-contaminant of the molten glass and has a lower coefficient of thermal conductivity than the bulk of the module material, whereby the rate of heat flow is reduced, thus delaying the high rate of heat transfer from the glass to the bulk of the module and permitting complete immersion of the modules in the molten glass prior to complete solidification of the molten glass within the relatively narrow spaces between adjacent modules; allowing the molten glass surrounding the modules to solidify; and allowing the module material to melt after said solidification and removing the molten module material from said hollow glass article.

2. The method as set forth in claim 1 wherein each of said modules comprises a hollow core having a plurality of spaced apertures traversing the walls thereof, and an external coating of a refractory, porous, heat insulating material and a vacuum is applied to the hollow interior of each module.

3. The method of forming a hollow glass article comprising the steps of:

(1) filling an open top mold, having a cavity generally defining the external configuration of the glass article, with a pool of molten glass;

(2) inserting into said pool a normally rigid module, having an external configuration corresponding to the desired internal configuration of the hollow glass article, the bulk of said module being formed of a material that is molten at the fiber softening point temperature of the glass and has sufficient heat absorbing capacity to solidify the adjacent surface layer of the molten glass contacting same, the outside surface portions of said module being formed of a heat insulating material which is a non-contaminant of the molten glass and has a lower coefficient of thermal conductivity than the bulk of the module material whereby the rate of heat flow is reduced, thus delaying the high rate of heat transfer from the glass to the bulk of the module and permitting complete immersion of the module in the molten glass prior to complete solidification of the adjacent surface layer of molten glass contacting the module;

(3) applying a fluid pressure differential to a portion of the surface of the pool of glass to urge the molten glass to flow upwardly relative to the module to surround same;

(4) allowing the molten glass surrounding the module to solidify; and (5) allowing the module material to melt after said solidification of the glass to form said hollow glass article, and removing the molten module material from said hollow glass article.

4. The method of claim 3 wherein said material of the bulk of said module is molten at the annealing point temperature of the glass.

5. A module for forming the cavity of a hollow glass article by immersion in molten glass, the bulk of said module being formed of a rigid material that is molten at the fiber softening point temperature of the glass and has sufficient heat absorbing capacity to solidify the adjacent surface layer of molten glass, and an external coating on said module of a heat insulating material having a lower coefficient of thermal conductivity than said rigid material of the bulk of said module.

6. The module of claim 5 wherein said coating comprises a gas pervious refractory material that is a non-contaminant of the molten glass.

7. The module of claim 6 wherein said coating comprises a matted, fibrous refractory silica-alumina material.

8. A module for forming the cavity of a hollow glass article by immersion in molten glass, said module comprising a hollow core formed of a rigid material that is molten at the annealing temperature of the glass and has sufficient heat absorbing capacity to solidify the adjacent surface layer of molten glass, said core having a plurality of spaced apertures traversing the walls thereof, and an external coating of a refractory, porous, heat insulating material.

9. A module for forming the cavity of a hollow glass article by immersion in molten glass, the bulk of said module being formed of a rigid material that is molten at the annealing point temperature of the glass and has sufficient heat absorbing capacity to solidify the adjacent surface layer of molten glass, and an external coating on said module of a heat insulating material having a lower coefficient of thermal conductivity than said rigid material of the bulk of said module.

10. A module for forming the cavity of a hollow glass article by immersion in molten glass, said module comprising a hollow core formed of a rigid material that is molten at the fiber softening point temperature of the glass and has sufficient heat absorbing capacity to solidify the adjacent surface layer of molten glass, said core having a plurality of spaced apertures traversing the walls thereof, and an external coating of a refractory, porous, heat insulating material.

References Cited

UNITED STATES PATENTS

| | | | |
|---|---|---|---|
| 301,329 | 7/1884 | Beck | 65—23 |
| 798,642 | 9/1905 | Wadsworth | 65—81 |
| 807,459 | 12/1905 | Harloe | 65—23 |
| 1,343,191 | 6/1920 | Allcutt. | |
| 2,045,716 | 6/1936 | McCauley | 65—93 XR |
| 2,434,780 | 1/1948 | Wiss et al. | |
| 2,924,851 | 2/1960 | Birckhead et al. | |
| 3,023,468 | 3/1962 | Hord et al. | |
| 3,148,968 | 9/1964 | Cypher et al. | 65—24 XR |
| 3,277,535 | 11/1966 | Rupert. | |

S. LEON BASHORE, *Primary Examiner.*

FRANK W. MIGA, *Assistant Examiner.*

U.S. Cl. X.R.

65—26, 33, 68, 169, 374